Inventors
Alfred W. Pearce and
Alan G. Hiscox

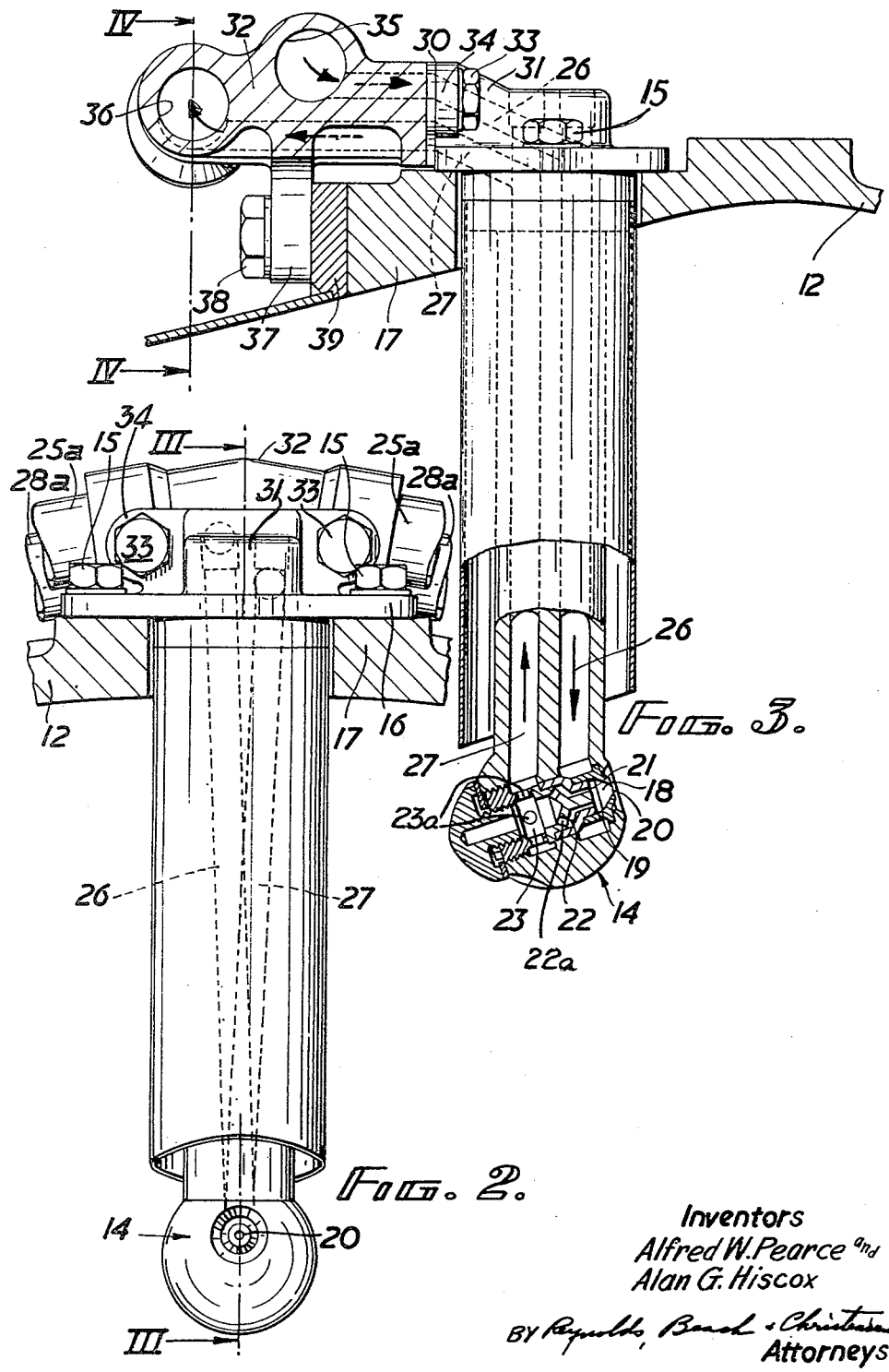

Oct. 5, 1954     A. W. PEARCE ET AL     2,690,648
MEANS FOR CONDUCTING THE FLOW OF LIQUID FUEL
FOR FEEDING BURNERS OF GAS TURBINE ENGINES
Filed July 1, 1952     3 Sheets-Sheet 3

Inventors
Alfred W. Pearce and
Alan G. Hiscox
BY Reynolds, Beach & Christensen
Attorneys Patented Oct. 5, 1954

2,690,648

UNITED STATES PATENT OFFICE 2,690,648

MEANS FOR CONDUCTING THE FLOW OF LIQUID FUEL FOR FEEDING BURNERS OF GAS TURBINE ENGINES

Alfred W. Pearce, Yate, near Bristol, and Alan G. Hiscox, Hatherley, Cheltenham, England, assignors to Dowty Equipment Limited, Cheltenham, England Application July 1, 1952, Serial No. 296,556

5 Claims. (Cl. 60—39.74)

Liquid fuel for combustion in a gas turbine engine is fed into the combustion chamber or chambers by a plurality of burners or atomisers arranged around the engine and interconnected by piping so that all can receive fuel from a common delivery line. If the burners or atomisers are of the spill type they are also interconnected by piping so that the returning fuel can pass into a common return line. The interconnecting piping is known as the burner gallery, and the object of this invention is to provide an improved construction and mounting of burner gallery requiring less accurate mounting of the various parts and affording ease of assembly and a ready means for permitting contraction or expansion under varying temperature conditions so that no strain will be placed upon the structure.

According to this invention, the burner gallery is constructed from rigid components comprising junction boxes and lengths of piping, preferably straight individually, which are adapted for mutual non-rigid sealing engagement.

The non-rigid sealing engagement of the pipes and junction boxes will preferably be such that each pipe is capable of axial movement with respect to its junction box and capable of universal movement, including transverse components. Any inaccuracies or tolerances due to manufacture will be taken up by the pipes accommodating themselves in the junction boxes. The whole assembly can thus accommodate itself about the fixed parts of the assembly, with a minimum of projection therefrom, and can also accommodate itself to changing temperature conditions, and to vibrational movement.

Each burner will preferably be constructed to receive a junction box fitting which will be rigidly secured to the burner. The burner together with its junction box will be rigidly mounted for example on the engine casing. The several burners with their respective junction boxes will form a fairly large number of fixed points closely spaced around the engine, and the short lengths of piping will interconnect the junction boxes with another junction with the common fuel delivery line. The lengths of piping will take up axial and inclined positions as dictated by the positions of the junction boxes, but will always be close to the engine casing. The junction with the common delivery line will preferably be disposed midway of the length of the gallery so that fuel from the delivery line will flow in opposite directions along opposite parts of the gallery. If the burners are of the spill type they will have similarly formed and interconnecting piping, also lying close to the engine casing. The junction of this return piping places the spill orifices of the burners in communication with a common return line, and this junction is preferably disposed midway of the length of the gallery and diametrically opposite the junction with the delivery line. The gallery will thus form an endless structure.

The invention will now be described with reference to the accompanying drawings, of which:

Figure 2 is an enlarged fragmentary view of Figure 1 showing one of the burners and the adjacent part of the gallery;

Figure 3 is a sectional view taken on the line III—III of Figure 2;

Figure 1:
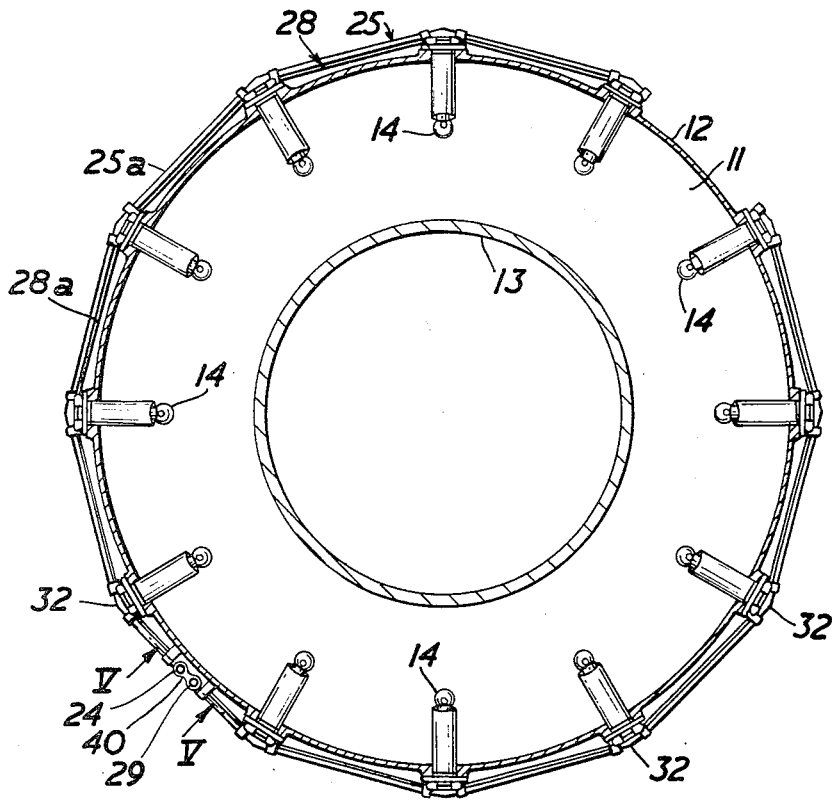
Figure 1 is a cross-sectional view through an annular combustion chamber of a gas turbine engine, showing a plurality of burners projecting inwardly into the combustion chamber, and the fuel gallery associated with the burners.

As shown in Figures 1 to 5, an annular combustion chamber 11 defined between outer and inner walls 12 and 13 respectively is adapted to receive atomised fuel at a large number of equally spaced points around the chamber by means of burners or atomisers 14 which extend radially inwardly from the outer wall 12. Each burner 14 is rigidly secured to the wall 12 by bolts 15 passing through a flange 16 on the outer part of the burner and into a thickened part 17 of said wall. The burners 14 are of the type known as spill burners, and comprise a circular-section swirl chamber 18 into which fuel enters through one or more tangential entry passages 19 to set up a swirling action within the chamber. At one end of the chamber 18 there is formed a discharge orifice 20 through which the fuel issues into the combustion chamber as a finely atomised conical spray. At the opposite end of the chamber 18 there is formed a spill orifice 21 which, as shown, is of continuous annular form opening in the return flow direction by way of ports 22a into diffusing chamber 22 from which the fuel can pass into a spill chamber 23. Fuel is fed to the tangential entry passages 19 of all the burners from a common delivery line 24 (Figures 1 and 5) which opens into a fuel gallery 25 extending in opposite directions from the delivery line 24 to reach an inlet passage 26 of each burner. The spill chamber 23 communicates by way of ports 23a with a return passage 27 which opens into a fuel gallery 28 with which there communicates a common spill or return line 29, said line 29 being disposed substantially midway of the length of the gallery 28.

The inlet and return passages 26 and 27 respectively of each burner terminate at the outer end of the burner in separate ports in a machined surface 30 on a head fitting 31 which is integral with the flange 16, and for each burner there is provided a junction box 32 adapted to be secured to the machined surface 30 of the burner by bolts 33 passing into the junction box through lugs 34 on the head fitting 31. The junction box 32 has a through passage 35 constituting part of the delivery gallery 25 and communicates through the corresponding port in the surface 30 with the inlet passage 26, and has a through passage 36 which constitutes part of the return gallery 28 and communicates through the other port in the surface 30 with the return passage 27. The junction box 32 is, as shown, preferably provided with lugs 37 by which it is clamped by bolts 38 which normally serve to secure a flange 39 of the engine casing to one end of the outer wall 12 of the combustion chamber 11.

Figure 5:
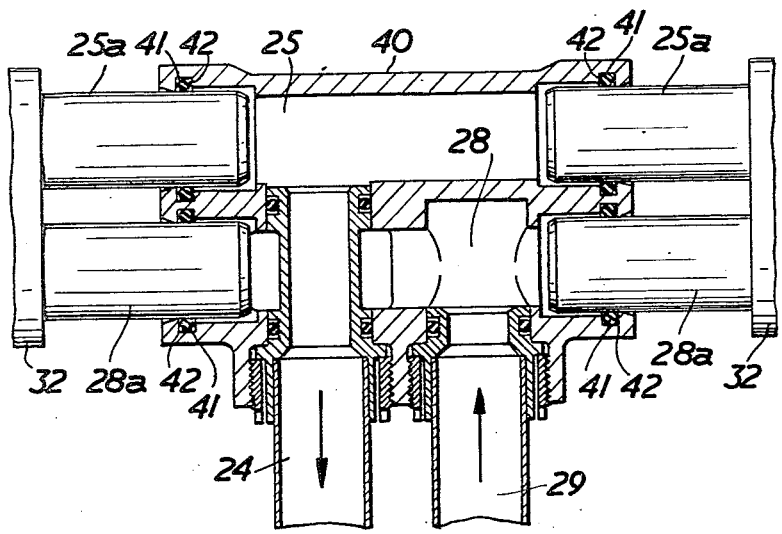
Figure 5 is a cross-sectional view taken on the line V—V of Figure 1.

The common delivery line 24 and the spill or return line 29 establish communication with the corresponding galleries 25 and 28 through a suitable junction box fitting 40 which is seen more clearly in Figure 5. The point of connection of each of the delivery line 24 and the spill line 29 to the galleries is immaterial, and both need not be connected through a single junction box nor at the same point about the combustion chamber.

The galleries 25 and 28 which are constituted in part by the several junction boxes 32 and by the junction box 40 are completed by lengths of piping 25a and 28a respectively which project loosely into the junction boxes and are sealed with respect thereto by rubber or like sealing rings 41 housed within grooves 42 in the junction boxes. The sealed connections established between the lengths of piping and the junction boxes are such that the lengths of piping are capable of limited axial movement and are capable of accommodating themselves angularly so as to extend from one junction box to another despite differences due to normal manufacturing tolerances.

The burner gallery above described is convenient both in manufacture and assembly and can be installed around engines of slightly differing sizes. The main advantage, however, resides in the fact that the galleries as a whole are capable of expanding and contracting in accordance with the expansion and contraction of the outer wall of the combustion chamber brought about by the widely varying temperature conditions to which said outer wall is subjected. The galleries are thus freed from stresses which might cause damage or even rupture at one or more points. In practice the degree of clearance between the ends of the lengths of piping and the recesses in the junction boxes will be such that only a minimum amount of relative movement is permitted between the pipes and junction boxes.

Figure 6:
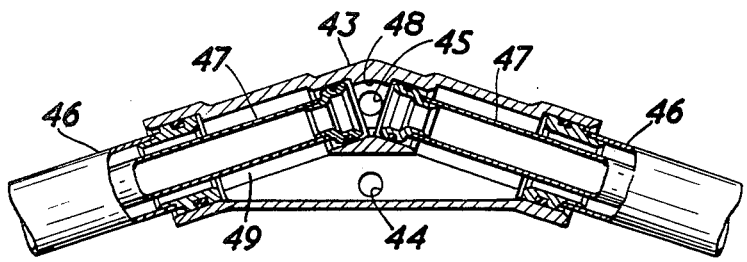
Figure 6 is a modification of the parts shown in Figure 4.
Figure 4:
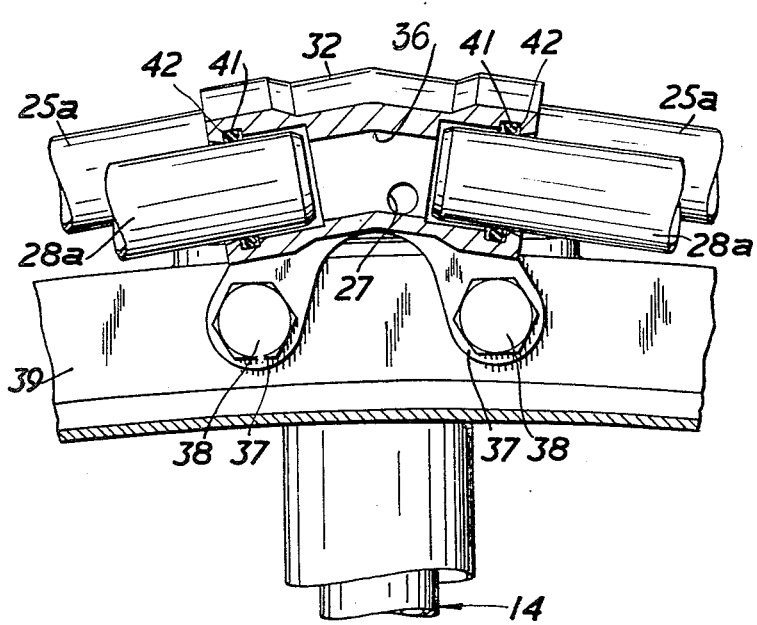
Figure 4 is a sectional view taken on the line IV—IV of Figure 3.

The invention may also be applied to a spill burner system in which the delivery and return galleries are arranged substantially concentrically one within the other. Figure 6 shows a junction box 43 to which a burner may be secured so as to communicate at its inlet and return sides with ports 44 and 45 respectively. The junction box 43 is adapted to receive at opposite ends thereof outer lengths of piping 46 and inner lengths of piping 47 which go to make up the delivery and return galleries respectively. The adjacent ends of the inner piping 47 communicate through a passage 48 defined entirely by the junction box 43, whereas the adjacent ends of the outer piping 46 communicate through a passage 49 defined in part by the junction box 43 and in part by the lengths of inner piping 47.

We claim:

1. A burner gallery assembly for the combustion chamber of a gas turbine engine, comprising a plurality of spill type burners adapted to be secured separately to the combustion chamber therearound and to project therein, said spill burners having supply and spill ducts formed therein, a plurality of junction boxes adapted to be attached to the combustion chamber, said junction boxes including one for each burner secured thereto and one adapted to be connected with both fuel supply and return conduits, a large diameter pipe socket at each end of said junction box, said pipe sockets being connected together and having one branch connection with one duct of the burner secured thereto, and each large diameter pipe socket further being arranged to lie co-axial with the opposite pipe socket on the adjacent junction box, a small diameter pipe socket at the base of each large diameter pipe socket, said small diameter pipe sockets being connected together and having a second branch connection with the other duct of the burner secured thereto, a straight and rigid large diameter connecting pipe held captively by the opposite large diameter pipe sockets in each adjacent pair of junction boxes, a straight and rigid small diameter connecting pipe held captively by the opposite small diameter pipe sockets in each adjacent pair of junction boxes, both large and small diameter pipes entering their respective sockets with both radial and axial clearance, and flexible sealing means interposed between each pipe socket and the pipe end held therein and adapted to provide a non-rigid sealing engagement therebetween.

2. A burner gallery assembly for the combustion chamber of a gas turbine engine such as is suitable for aircraft use, said assembly comprising a plurality of burners, each including a radially inwardly directed stem and a nozzle carried by the inner end of said stem, each stem being formed with fuel conduit means extending between said nozzle and the stem's exterior end; a junction box for each stem whereto said stem is joined at its outer end, and which is chambered to contain fuel, and for communication with said conduit means, and mounting means for the securement of said junction box upon the combustion chamber of the engine, each in spaced relationship about the engine from other such junction boxes, each junction box having at least two oppositely directed ports for passage of fuel to and through its chamber, each disposed substantially tangentially of the engine and aligned coaxially with the facing and corresponding port of the next adjacent junction boxes at each side, respectively; a junction box having means for connection to a fuel reservoir; a plurality of straight lengths of pipe, one length for each space between coaxial junction box ports, and each of a length and diameter to fit telescopingly and loosely relative to the coaxially aligned ports of two successive junction boxes which are thereby connected; and resilient sealing means interposed between the telescopingly connected pipe lengths and their respective ports, affording a non-rigid sealing engagement therebetween.

3. A burner gallery assembly as and for use in the environment stated in claim 2, characterized in that the burner nozzle is of the spill type, and wherein the stem's fuel conduit means includes a fuel supply passage and a return passage, and each junction box is formed with two non-communicating chambers, one for supply and the other for return of fuel, connected to the respective passages, and wherein each junction box is formed with four ports, namely two oppositely directed ports for fuel supply aligned with supply ports of the junction boxes at the respectively opposite sides, and two oppositely directed ports for fuel return aligned with return ports of the junction boxes at the respectively opposite sides, and one junction box having two means connecting with its respective chambers, for connection to a fuel reservoir for supply and for return of fuel, respectively; said gallery assembly including also pipe lengths connecting the ports for supply and other pipe lengths connecting the ports for return, respectively, of each two successive junction boxes, and resilient sealing means as stated in claim 2 for each end of each length of pipe.

4. A burner gallery assembly as and for use in the environment stated in claim 3, wherein that junction box which has means for connection to the fuel reservoir is devoid of a burner, and is located intermediate two burner-equipped junction boxes, with its ports aligned with the corresponding ports of each of the latter, and is connected with each of the latter's ports by pipe lengths, in the manner stated in claim 3.

5. A burner gallery assembly as and for use in the environment stated in claim 2, wherein the ports of the junction boxes are socketed, and the lengths of pipe fit at their ends loosely into the corresponding sockets, the resilient sealing means being located in the sockets, intermediate the pipe end and the socket wall.

References Cited in the file of this patent

UNITED STATES PATENTS

| Number | Name | Date |
|---|---|---|
| 2,182,797 | Dillen | Dec. 12, 1939 |
| 2,432,359 | Streid | Dec. 9, 1947 |
| 2,436,815 | Lum | Mar. 2, 1948 |
| 2,531,922 | Seamark | Nov. 28, 1950 |
| 2,575,264 | Feilden | Nov. 13, 1951 |
| 2,595,566 | Carey | May 6, 1952 |